(12) United States Patent
Li

(10) Patent No.: US 9,886,615 B2
(45) Date of Patent: Feb. 6, 2018

(54) FINGERPRINT IDENTIFICATION MODULE, FINGERPRINT IDENTIFICATION METHOD AND DISPLAY DEVICE

(71) Applicant: BOE TECHNOLOGY GROUP CO., LTD., Beijing (CN)

(72) Inventor: Yingyi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/324,655

(22) PCT Filed: Feb. 18, 2016

(86) PCT No.: PCT/CN2016/074023
§ 371 (c)(1),
(2) Date: Jan. 6, 2017

(87) PCT Pub. No.: WO2017/045359
PCT Pub. Date: Mar. 23, 2017

(65) Prior Publication Data
US 2017/0300735 A1    Oct. 19, 2017

(30) Foreign Application Priority Data
Sep. 16, 2015 (CN) .......................... 2015 1 0591339

(51) Int. Cl.
*G06K 9/00* (2006.01)
*G06F 21/32* (2013.01)

(52) U.S. Cl.
CPC ........... *G06K 9/0002* (2013.01); *G06F 21/32* (2013.01); *G06K 9/00087* (2013.01)

(58) Field of Classification Search
USPC ................................................. 382/124, 318
See application file for complete search history.

(56) References Cited

U.S. PATENT DOCUMENTS 9,710,689 B2 *   7/2017   Evans, V .............. G06K 9/0002
2009/0083847 A1 *   3/2009   Fadell .................... G06F 21/316
726/16

(Continued)

FOREIGN PATENT DOCUMENTS

CN   103810479 A   5/2014
CN   103870817 A   6/2014

(Continued)

OTHER PUBLICATIONS

International Search Report and Written Opinion (including English translation of Box V) dated Jun. 28, 2016, for corresponding PCT Application No. PCT/CN2016/074023.

(Continued)

*Primary Examiner* — Kathleen Y Dulaney
(74) *Attorney, Agent, or Firm* — Kinney & Lange, P.A.

(57) ABSTRACT

Embodiments of the present disclosure provide a fingerprint identification module, a fingerprint identification method and a display device. The fingerprint identification module includes: a capacitive sensor having a plurality of capacitive electrodes which do not contact with each other, the capacitive sensor being configured to identify a fingerprint of a finger based on induced capacitances generated between the capacitive electrodes and ridges in an epidermal layer of the finger and generated between the capacitive electrodes and valleys in the epidermal layer; a radio-frequency sensor having a plurality of radio-frequency receiving electrodes which do not contact with each other, the radio-frequency sensor being configured to identify the fingerprint based on reflected signals received by the radio-frequency receiving electrodes; and a controller configured to activate the radio-frequency sensor to identify the fingerprint when fingerprint information identified by the capacitive sensor is not con- (Continued)

sistent with fingerprint information pre-stored in the fingerprint identification module.

14 Claims, 8 Drawing Sheets

(56) References Cited

U.S. PATENT DOCUMENTS

| | | | | |
|---|---|---|---|---|
| 2014/0294259 A1* | 10/2014 | Lee | ............... | G06K 9/033 |
| | | | | 382/124 |
| 2016/0154956 A1* | 6/2016 | Fadell | ............ | G06F 21/316 |
| | | | | 726/19 |

FOREIGN PATENT DOCUMENTS

| | | |
|---|---|---|
| CN | 103942481 A | 7/2014 |
| CN | 104376299 A | 2/2015 |
| CN | 105095887 A | 11/2015 |
| CN | 204926126 U | 12/2015 |

OTHER PUBLICATIONS

First Chinese Office Action, for Chinese Patent Application No. 201510591339.8, dated Dec. 26, 2017, 10 pages.

* cited by examiner

FINGERPRINT IDENTIFICATION MODULE, FINGERPRINT IDENTIFICATION METHOD AND DISPLAY DEVICE

CROSS-REFERENCE TO RELATED APPLICATION

This application is a Section 371 National Stage Application of International Application No. PCT/CN2016/074023, filed on Feb. 18, 2016, entitled "FINGERPRINT IDENTIFICATION MODULE, FINGERPRINT IDENTIFICATION METHOD AND DISPLAY DEVICE", which has not yet published, which claims priority to Chinese Application No. 201510591339.8, filed on Sep. 16, 2015, incorporated herein by reference in their entirety.

BACKGROUND OF THE DISCLOSURE

Field of the Disclosure

The present disclosure relates to a field of display technology, in particular, to a fingerprint identification module, a fingerprint identification method and a display device.

Description of the Related Art

A fingerprint is a pattern formed of raised portions (i.e. ridges) and recessed portions (i.e. valleys) which are linearly arranged on an epidermal layer of a finger. As the fingerprint has characteristics such as invariance, uniqueness, convenience and the like, it has become a pronoun of biometric feature identification. As a result, the fingerprint is widely used in various identity information authentication and identification fields, for example, security facility, attendance system, etc.

However, if there is oil, dust or water on a finger surface, a detection of a capacitance may be greatly influenced. As a result, it is difficult to identify fingerprint information of a user.

SUMMARY

In order to solve at least one aspect of the above problems, embodiments of the present disclosure provide a fingerprint identification module, a fingerprint identification method and a display device.

According to an aspect of the present disclosure, it is provided a fingerprint identification module, comprising:

a capacitive sensor comprising a plurality of capacitive electrodes which do not contact with each other, the capacitive sensor being configured to identify a fingerprint of a finger of the user based on induced capacitances generated between the capacitive electrodes and ridges in an epidermal layer of the finger and generated between the capacitive electrodes and valleys in the epidermal layer;

a radio-frequency sensor comprising a plurality of radio-frequency receiving electrodes which do not contact with each other, the radio-frequency sensor being configured to identify the fingerprint based on reflected signals received by the radio-frequency receiving electrodes, the reflected signals being signals which are reflected by a texture structure between the epidermal layer and a dermal layer of the finger when radio-frequency signals from the radio-frequency sensor contact the texture structure; and a controller communicated with both the capacitive sensor and the radio-frequency sensor, the controller being configured to activate the radio-frequency sensor to identify the fingerprint of the user when fingerprint information identified by the capacitive sensor is not consistent with fingerprint information of the user pre-stored in the fingerprint identification module.

According to an embodiment of the present disclosure, the capacitive electrodes and the radio-frequency receiving electrodes are alternately arranged.

According to an embodiment of the present disclosure, the capacitive sensor further comprise a first image generator connected to the capacitive electrodes and configured to generate a first local fingerprint image based on the induced capacitances; and the fingerprint identification module further comprises an image processor connected to the capacitive sensor, the image processor being configured to store the fingerprint information of the user, the fingerprint information comprising an entire fingerprint image or a local fingerprint image of the finger of the user; to read the first local fingerprint image; to compare the read first local fingerprint image with the entire fingerprint image or local fingerprint image stored in the image storage unit; and to send an alarm signal to the controller when the first local fingerprint image is not consistent with the entire fingerprint image or local fingerprint image stored in the image storage unit.

According to an embodiment of the present disclosure, the controller is configured to activate the radio-frequency sensor to identify the fingerprint of the user when receiving the alarm signal.

According to an embodiment of the present disclosure, the radio-frequency sensor further comprises:

a radio-frequency signal generator configured to generate radio-frequency signals;

radio-frequency signal reference electrodes which correspond to the radio-frequency receiving electrodes, respectively and are connected to the radio-frequency signal generator for sending the radio-frequency signals to the finger of the user; and a second image generator configured to generate a second local fingerprint image based on the reflected signals, wherein the image processor is further connected to the radio-frequency sensor, and the image processor is further configured to read the second local fingerprint image, and to compare the read second local fingerprint image with the entire fingerprint image or local fingerprint image stored in the image storage unit.

According to an embodiment of the present disclosure, the radio-frequency signal reference electrodes have a structure of an integrated layer, and the capacitive electrodes are positioned at a side of the radio-frequency signal reference electrodes close to the finger of the user.

According to an embodiment of the present disclosure, the radio-frequency sensor further comprises a signal amplifier configured to amplify the reflected signals and then to send the amplified signals to the second image generator, and wherein the radio-frequency signal reference electrodes are provided with via-holes, through which the radio-frequency receiving electrodes are connected with the signal amplifier.

According to an embodiment of the present disclosure, both the capacitive electrodes and the radio-frequency receiving electrodes are respectively arranged into rows in a first direction, and the rows of capacitive electrodes and the rows of radio-frequency receiving electrodes are alternately arranged; or both the capacitive electrodes and the radio-frequency receiving electrodes are respectively arranged into rows in a second direction, and the rows of capacitive electrodes and the rows of radio-frequency receiving electrodes are alternately arranged; or both the capacitive electrodes and the radio-frequency receiving electrodes are alternately arranged both in the first direction and in the second direction, wherein the first direction and the second direction intersect with each other.

According to an embodiment of the present disclosure, the capacitive electrodes and the radio-frequency receiving electrodes have the same shape which is a rhombus shape, both the capacitive electrodes and the radio-frequency receiving electrodes are alternately arranged both in the first direction and in the second direction, and the first direction and the second direction are parallel to two adjacent sides of the rhombus, respectively.

According to an embodiment of the present disclosure, the capacitive electrodes and the radio-frequency receiving electrodes have the same shape which is selected from circle, oval and regular hexagon shapes, the first direction and the second direction are a column direction and a row direction, respectively, and wherein both the capacitive electrodes and the radio-frequency receiving electrodes are respectively arranged into columns in the column direction, and the columns of capacitive electrodes and the columns of radio-frequency receiving electrodes are alternately arranged, wherein, in any one column of capacitive electrodes and one adjacent column of radio-frequency receiving electrodes, a symmetrical axis of the circle, oval or regular hexagon of any one of the capacitive electrodes and the radio-frequency receiving electrodes in a direction perpendicular to the column direction is positioned between two circles, ovals or regular hexagons of two adjacent other ones of the capacitive electrodes and the radio-frequency receiving electrodes.

Alternatively, both the capacitive electrodes and the radio-frequency receiving electrodes are respectively arranged into rows in the row direction, and the rows of capacitive electrodes and the rows of radio-frequency receiving electrodes are alternately arranged, wherein, in any one row of capacitive electrodes and one adjacent row of radio-frequency receiving electrodes, a symmetrical axis of the circle, oval or regular hexagon of any one of the capacitive electrodes and the radio-frequency receiving electrodes in a direction perpendicular to the row direction is positioned between two circles, ovals or regular hexagons of two adjacent other ones of the capacitive electrodes and the radio-frequency receiving electrodes.

According to an embodiment of the present disclosure, the capacitive electrodes and the radio-frequency receiving electrodes have the same shape which is a rectangular shape, the first direction is one of a row direction and a column direction, and the second direction is the other one of the row direction and the column direction.

According to an embodiment of the present disclosure, the capacitive electrodes and the radio-frequency receiving electrodes are distributed in such a way that there are 400-600 electrodes per square inch.

According to another aspect of the present disclosure, it is provided a display device comprising a fingerprint identification module according to any one of the above aspect and embodiments.

According to a further aspect of the present disclosure, it is provided a fingerprint identification method comprising:

identifying a fingerprint of a user by means of a capacitive sensor; and activating a radio-frequency sensor to identify the fingerprint of the user when the fingerprint identified by the capacitive sensor is not consistent with fingerprint information of the user pre-stored in the fingerprint identification module.

According to an embodiment of the present disclosure, the step of identifying a fingerprint of a user by means of a capacitive sensor comprises:

detecting induced capacitances generated between capacitive electrodes of the capacitive sensor and ridges on an epidermal layer of a finger and generated between the capacitive electrodes and valleys on the epidermal layer; and identifying the fingerprint based on the induced capacitances.

According to an embodiment of the present disclosure, the step of activating a radio-frequency sensor to identify the fingerprint of the user when the fingerprint identified by the capacitive sensor is not consistent with fingerprint information of the user pre-stored in the fingerprint identification module comprises:

obtaining reflected signals by means of the radio-frequency receiving electrodes when the fingerprint identified by the capacitive sensor is not consistent with the fingerprint information of the user pre-stored in the fingerprint identification module, the reflected signals being signals which are reflected by a texture structure between an epidermal layer and a dermal layer of the finger when radio-frequency signals from the radio-frequency sensor contact the texture structure; and identifying the fingerprint based on the reflected signals.

BRIEF DESCRIPTION OF THE DRAWINGS

In order to explain technical solutions of the embodiments of the present disclosure more clearly, the drawings required to describe the embodiments are briefly introduced below. It is apparent that the described drawings are merely a part of the embodiments of the present disclosure. Those skilled in the art may obtain other drawings based on these drawings without paying any creative efforts.

LIST OF REFERENCE NUMERALS

Figure 1:
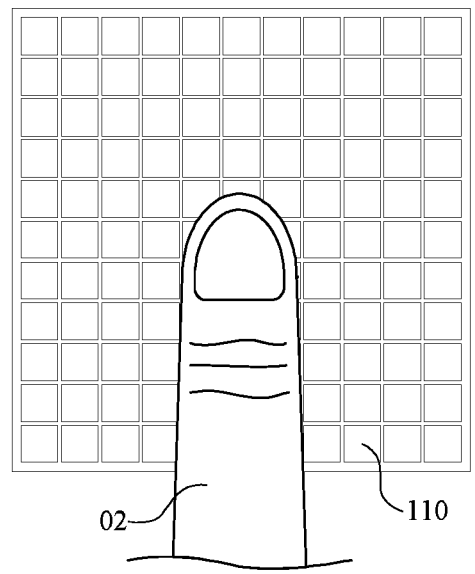
FIG. 1 is a schematic view of an operation in a capacitive identification mode.

| 01—fingerprint identification module; | 11—capacitive sensor; |
| 110—capacitive electrode; | 12—radio-frequency sensor; |
| 120—radio-frequency receiving electrode; | |
| 121—radio-frequency signal generator; | |
| 122—radio-frequency signal reference electrode; | |
| 123—signal amplifier; | 13—image processor; |
| 14—controller; | 02—finger of a user; |
| 021—ridge of a fingerprint; | 022—valley of a fingerprint; |
| 02a—epidermal layer; | 02b—dermal layer; |
| 03—display device. | |

DETAILED DESCRIPTION OF PREFERRED EMBODIMENTS OF THE DISCLOSURE

Hereinafter, technical solutions in the embodiments of the present disclosure will be clearly and completely described in conjunction with the drawings of the embodiments of the present disclosure. It is obvious that the embodiments to be described are only a part of embodiments of the present disclosure, rather than all of the embodiments. Based on the embodiments of the present disclosure, all other embodiments obtained by those skilled in the art without any creative efforts belong to the scope of the present invention.

It is to be noted that, unless otherwise defined, all terms (including technical and scientific terms) used in the embodiments of the present disclosure have the same meanings as meanings which are commonly understood by those skilled in the art. It is also to be noted that, terms such as those defined in the usual dictionary should be interpreted to have meanings consistent with their meanings in the context of the related art and should not be interpreted in an idealized or highly formalized sense, unless expressly so defined herein.

Further, the terms "up", "down", "row direction", and "column direction" and the like as used in the specification and the claims of the present disclosure indicate orientations or position relations which are based on the orientations or position relationships as shown in the drawings, merely for purposes of describing the present disclosure and simplifying the description, rather than to indicate or imply that the indicated device or element must have a particular orientation, or be constructed and operated in a particular orientation. Thus, such terms are not to be considered as limiting the present disclosure. Solutions which are obtained by rotating the solutions of the present disclosure by 90 degrees or mirroring the solutions of the present disclosure also belong to the scope of the present invention.

Since peaks and valleys in the fingerprints in the embodiments of the present disclosure are very small in size, usually in the order of millimeters (mm) or less, the dimensions of the structures in the drawings of the present disclosure are enlarged for the sake of clarity, so that they do not represent the actual size and scale.

Figure 2:
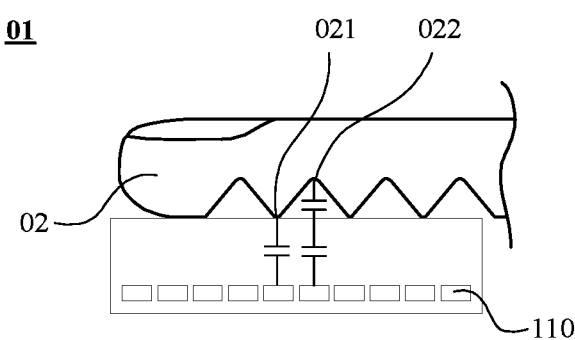
FIG. 2 is a schematic view of a principle of a capacitive identification mode.

Referring to FIGS. 1 and 2, a principle of a capacitive identification mode is shown. In a fingerprint identification module 01, a plurality of capacitive electrodes 110 arranged in an array and applied to a certain electric potential are provided. When a finger 02 of a user contacts a surface of the module, as ridges 021 are raised and valleys 022 are recessed in a fingerprint pattern, capacitances generated between the capacitive electrodes 110 and the ridges 021 are different from capacitances generated between the capacitive electrodes 110 and the valleys 022 according to a relationship between the capacitance and the distance. The capacitances generated between the capacitive electrodes 110 and the ridges 021 and generated between the capacitive electrodes 110 and the valleys 022 are converted into two-dimensional image data, so that an entire or local image of the fingerprint contacting the fingerprint identification module may be obtained. Then, the obtained fingerprint image is compared with an image pre-stored in the fingerprint identification module. If the two images are matched, the identity information of the user is certified, then subsequent operations such as registration, phone unlocking and the like may be allowed.

Figure 3:
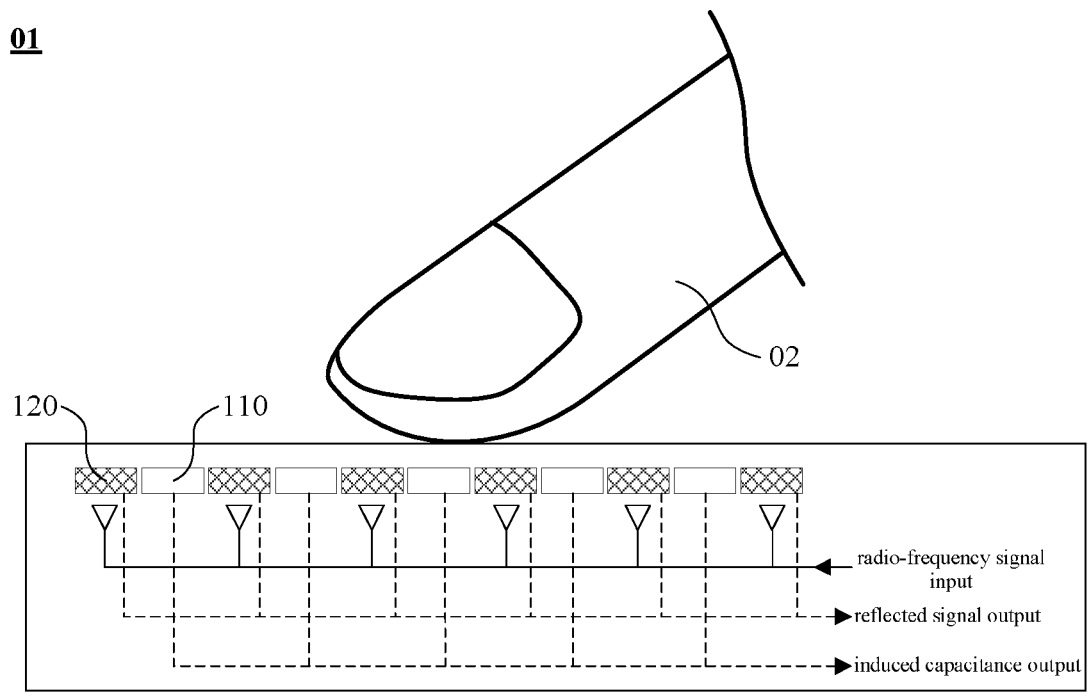
FIG. 3 is a structural schematic view of a cross section of a fingerprint identification module according to an embodiment of the present disclosure.
Figure 4:
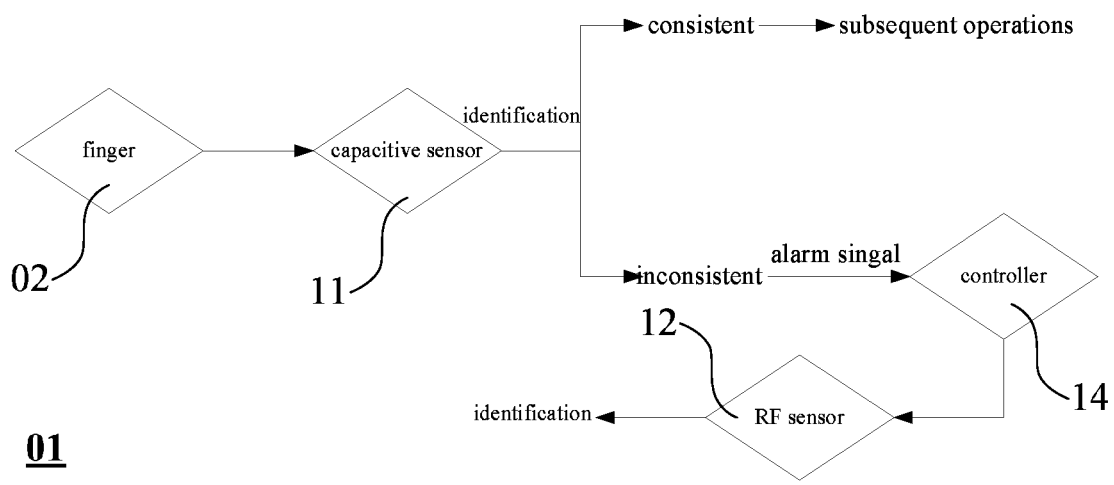
FIG. 4 is a functional schematic view of a fingerprint identification module according to an embodiment of the present disclosure.

Specifically, an embodiment of the present disclosure provides a fingerprint identification module 01. Referring to FIGS. 3 and 4, the fingerprint identification module 01 may comprise a capacitive sensor 11, a radio-frequency sensor 12 and a controller 14. The capacitive sensor 11 comprises a plurality of capacitive electrodes 110 spaced apart from each other. The capacitive sensor 11 is configured to identify a fingerprint of a finger of the user based on induced capacitances generated between the capacitive electrodes 110 and the ridges 021 and generated between the capacitive electrodes 110 and the valleys 022. The radio-frequency sensor 12 may comprise a plurality of radio-frequency receiving electrodes 120 spaced apart from each other. The radio-frequency sensor 12 is configured to identify the fingerprint based on reflected signals received by the radio-frequency receiving electrodes 120. The reflected signals are signals which are reflected by a texture structure (see FIG. 5) between an epidermal layer 02a and a dermal layer 02b of the finger when radio-frequency signals from the radio-frequency sensor 12 contact the texture structure. In an example, the capacitive electrodes 110 and the radio-frequency receiving electrodes 120 are alternately arranged. As shown in FIG. 4, the controller 14 is communicated with both the radio-frequency receiving electrodes 120 and the radio-frequency sensor 12, and configured to activate the radio-frequency sensor 12 to identify the fingerprint of the user when the fingerprint information identified by the capacitive sensor 11 is not matched with the fingerprint information of the user pre-stored in the fingerprint identification module 01.

It should be noted that the above fingerprint identification module 01 may also comprise a testing screen or protective screen or the like, which covers the capacitive sensor 11 and the radio-frequency sensor 12 and contacts the finger 02 of the user. Specifically, the capacitive sensor 11 and the radio-frequency sensor 12 may be integrated into a semi-conductive base material.

Figure 5:
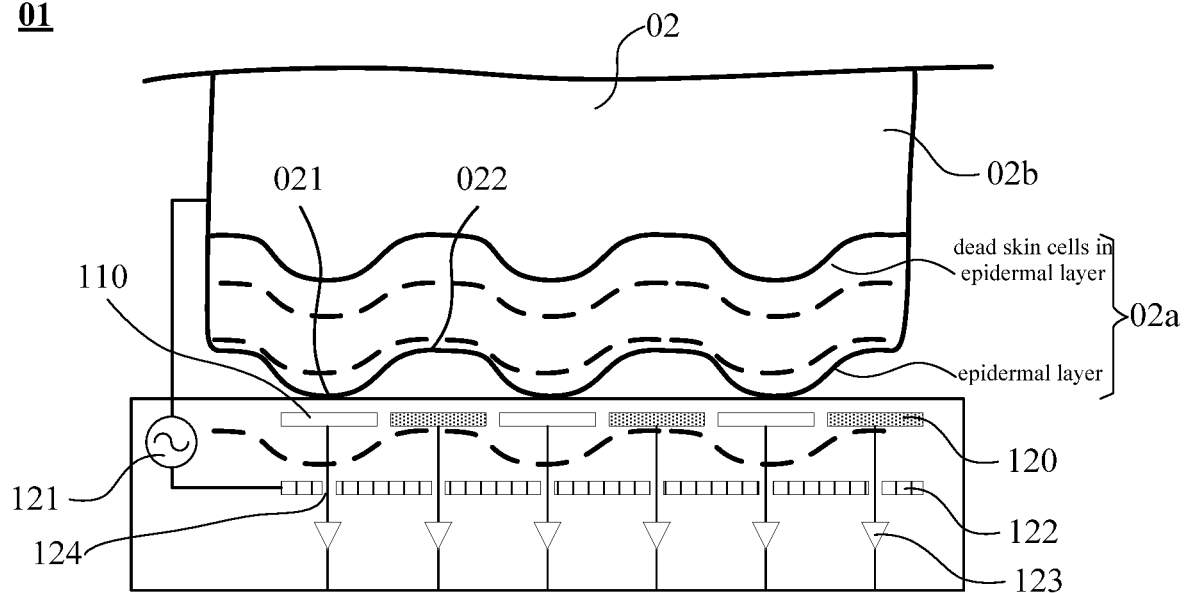
FIG. 5 is a schematic view of a principle of a radio-frequency identification mode in a fingerprint identification module according to an embodiment of the present disclosure.

A principle based on which the radio-frequency sensor 12 identifies the fingerprint is similar as a work principle of radar. As shown in FIG. 5, radio-frequency signals are transmitted through non-conductive dead skin cells in the epidermal layer of the finger 02 of the user and transmitted to an inner layer of the skin (i.e. conductive dermal layer 02b) which is located at a deeper position than the epidermal layer. The radio-frequency signals are bent due to an influence of the dermal layer 02b. The texture structure between the dermal layer 02b and the epidermal layer 02a of the finger corresponds to a structure of the ridges 021 and the valleys 022 on the epidermal layer 02a of the finger. The radio-frequency signals are reflected onto the radio-frequency receiving electrodes 120 by the texture structure between the dermal layer 02b and the epidermal layer 02a of the finger. By detecting the reflected signals (as indicated by wavy lines as shown), the entire or local image of the fingerprint contacting the testing screen may be obtained. Then, the obtained fingerprint image is compared with the image pre-stored in the fingerprint identification module. If the two images are matched, the identity information of the user is certified, then subsequent operations such as registration, phone unlocking and the like may be allowed.

As the radio-frequency signals are transmitted to the conductive dermal layer 02b inside the finger, they are not influenced by oil, dust or water on the epidermal layer 02a of the finger. Further, as an imitated fingerprint is not conductive, the radio-frequency sensor 12 may also prevent a behavior that the fingerprint identification is performed by using the imitated fingerprint.

Here, those skilled in the art may also understand that the entire fingerprint image or local fingerprint image of the finger of the user may be pre-stored in the above fingerprint identification module 01, so as to facilitate comparing with the identification result of the capacitive sensor 11 or the radio-frequency sensor 12.

In this way, the fingerprint identification module according to the embodiment of the present disclosure may have two identification modes, that is, capacitive identification mode and radio-frequency identification mode. The fingerprint information of the user may be firstly directly identified through the capacitive identification mode. If the identified fingerprint information is not consistent with the pre-stored fingerprint information of the user, the fingerprint information of the user may be identified through the radio-frequency identification mode, so as to improve an accuracy of the fingerprint identification.

Figure 6A:
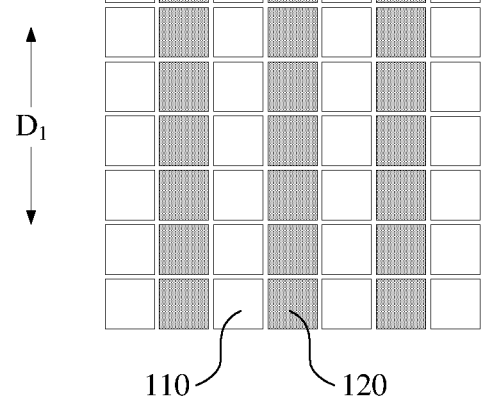
FIG. 6(a) shows an arrangement manner of capacitive electrodes and radio-frequency receiving electrodes in a fingerprint identification module according to an embodiment of the present disclosure.
Figure 6B:
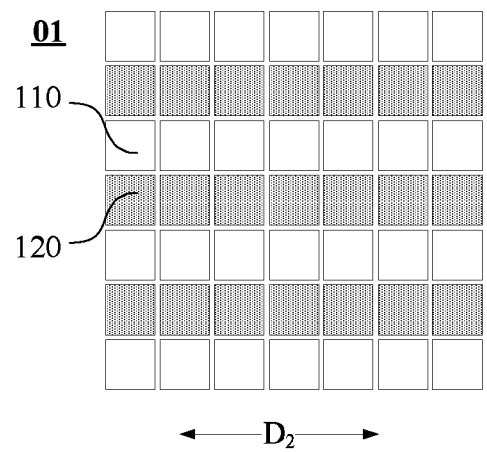
FIG. 6(b) shows another arrangement manner of capacitive electrodes and radio-frequency receiving electrodes in a fingerprint identification module according to an embodiment of the present disclosure.
Figure 6C:
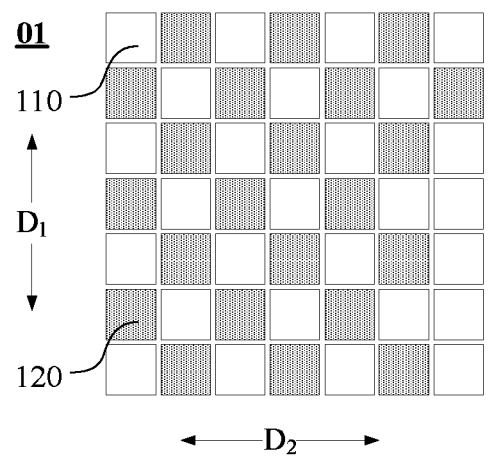
FIG. 6(c) shows a further arrangement manner of capacitive electrodes and radio-frequency receiving electrodes in a fingerprint identification module according to an embodiment of the present disclosure.

Further, as shown in FIGS. 6(a) to 6(c), the capacitive electrodes 110 and the radio-frequency receiving electrodes 120 are alternately arranged. In this way, when the finger 02 of the user contacts the fingerprint identification module 01, the plurality of capacitive electrodes 110 spaced apart by the radio-frequency receiving electrodes 120 are capable of identifying the fingerprint of the user, based on the induced capacitances generated between the capacitive electrodes 110 and the ridges 021 and generated between the capacitive electrodes 110 and the valleys 022. Also, the plurality of radio-frequency receiving electrodes 120 spaced apart by the capacitive electrodes 110 are capable of identifying the fingerprint of the user, based on the reflected signals reflected onto the radio-frequency receiving electrodes 120 by the texture structure between the dermal layer 02b and the epidermal layer 02a of the finger.

Herein, the capacitive electrodes 110 and the radio-frequency receiving electrodes 120 may be alternately arranged in multiple manners.

As an example, the capacitive electrodes 110 and the radio-frequency receiving electrodes 120 may be arranged in a first manner. As shown in FIG. 6(a), both the capacitive electrodes 110 and the radio-frequency receiving electrodes 120 may be respectively arranged into columns in a first direction (labeled as D1 in figures and hereinafter), and the columns of capacitive electrodes 110 and the columns of radio-frequency receiving electrodes 120 are alternately arranged.

Alternatively, the capacitive electrodes 110 and the radio-frequency receiving electrodes 120 may be arranged in a second manner. As shown in FIG. 6(b), both the capacitive electrodes 110 and the radio-frequency receiving electrodes 120 may be respectively arranged into rows in a second direction (labeled as D2 in figures and hereinafter), and the rows of capacitive electrodes 110 and the rows of radio-frequency receiving electrodes 120 are alternately arranged.

Further alternatively, the capacitive electrodes 110 and the radio-frequency receiving electrodes 120 may be arranged in a third manner. As shown in FIG. 6(c), both the capacitive electrodes 110 and the radio-frequency receiving electrodes 120 may be alternately arranged both in the first direction D1 and in the second direction D2.

In the embodiment, the first direction D1 and the second direction D2 intersect with each other, and a specific intersection angle is not limited here.

It should be noted that the arrangements of the capacitive electrodes 110 and the radio-frequency receiving electrodes 120 are simply illustrated in FIGS. 6(a) to 6(c) by way of example in which the first direction D1 is a column direction and the second direction D2 is a row direction (that is, the intersection angle of the two directions is equal to 90 degrees).

Further, as an example, in FIGS. 6(a) to 6(c), the capacitive electrodes 110 and the radio-frequency receiving electrodes 120 have the same shape which is a square shape. Besides the square shape, the capacitive electrodes 110 and the radio-frequency receiving electrodes 120 may also be in rectangle, circle, oval, rhombus, regular hexagon shapes and the like. Additionally, the capacitive electrodes 110 and the radio-frequency receiving electrodes 120 may have different shapes. In the embodiment of the present disclosure, both the specific shapes and sizes of the capacitive electrodes 110 in the capacitive sensor 11 and the radio-frequency receiving electrodes 120 in the radio-frequency sensor 12 are not limited, as long as the two electrodes are alternately arranged.

In this way, the plurality of capacitive electrodes 110, which do not contact with each other, are spaced apart by the radio-frequency receiving electrodes 120, so that the fingerprint image obtained by the capacitive sensor 11 is a local fingerprint image of the finger 02 of the user, rather than the entire fingerprint image. Similarly, the plurality of radio-frequency receiving electrodes 120, which do not contact with each other, are spaced apart by the capacitive electrodes 110, so that the fingerprint image obtained by the radio-frequency sensor 12 is a local fingerprint image of the finger 02 of the user, rather than the entire fingerprint image.

Here, on the one hand, the smaller the sizes of the capacitive electrodes 110 and the radio-frequency receiving electrodes 120 are, the higher the identification accuracies of the capacitive sensor 11 and the radio-frequency sensor 12 are. On the other hand, the smaller the sizes of the electrodes are, the manufacturing difficulties thereof are. As a result, it is necessary to consider the requirement for the identification accuracies of the capacitive sensor 11 and the radio-frequency sensor 12 in an actual application and the manufacturing difficulties in the embodiment. Optionally, the capacitive electrodes 110 and the radio-frequency receiving electrodes 120 may be distributed in such a way that there are 400-600 electrodes per square inch. In other words, in one square inch area of the fingerprint identification module 01, there are 400-600 electrodes including alternately arranged capacitive electrodes 110 and radio-frequency receiving electrodes 120.

Alternatively, the capacitive electrodes 110 and the radio-frequency receiving electrodes 120 may also be arranged in the following manners.

Figure 7:
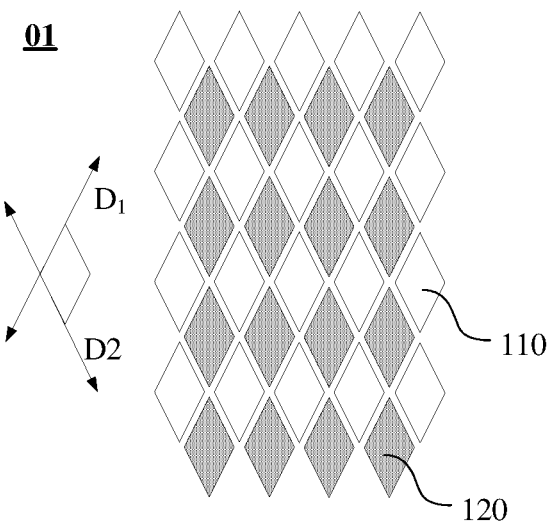
FIG. 7 shows still another arrangement manner of capacitive electrodes and radio-frequency receiving electrodes in a fingerprint identification module according to an embodiment of the present disclosure.

As shown in FIG. 7, the capacitive electrodes 110 and the radio-frequency receiving electrodes 120 may have the same shape which is a rhombus shape. And both the capacitive electrodes 110 and the radio-frequency receiving electrodes 120 may be alternately arranged both in the first direction D1 and in the second direction D2.

In the illustrated embodiment, the first direction and the second direction are parallel to two adjacent sides of the rhombus, respectively.

In this way, compared with the arrangements illustrated in FIGS. 6(a) to 6(c), the structures of the capacitive electrodes 110 and the radio-frequency receiving electrodes 120 may be more compact by using the rhombus shape and alternately arranging the two electrodes both in the first direction D1 and in the second direction D2. As a result, a space utilization rate of the fingerprint identification module may be higher, more ridges and valleys of the fingerprint pattern may be identified and the identification accuracy may be increased.

Alternatively, the capacitive electrodes 110 and the radio-frequency receiving electrodes 120 may have the same shape which is selected from circle, oval and regular hexagon shapes. In these embodiments, the first direction D1 and the second direction D2 may be a column direction and a row direction, respectively. Both the capacitive electrodes 110 and the radio-frequency receiving electrodes 120 may be respectively arranged into columns in the column direction, and the columns of capacitive electrodes 110 and the columns of radio-frequency receiving electrodes 120 are alternately arranged. Alternatively, both the capacitive electrodes 110 and the radio-frequency receiving electrodes 120 may be respectively arranged into rows in the row direction, and the rows of capacitive electrodes 110 and the rows of radio-frequency receiving electrodes 120 are alternately arranged.

Further, in any one column of capacitive electrodes 110 and one adjacent column of radio-frequency receiving electrodes 120, any one of the capacitive electrodes 110 and the radio-frequency receiving electrodes 120 is offset from two adjacent other ones of the capacitive electrodes 110 and the radio-frequency receiving electrodes 120. Alternatively, in any one row of capacitive electrodes 110 and one adjacent row of radio-frequency receiving electrodes 120, any one of the capacitive electrodes 110 and the radio-frequency receiving electrodes 120 is offset from two adjacent other ones of the capacitive electrodes 110 and the radio-frequency receiving electrodes 120.

Figure 8A:
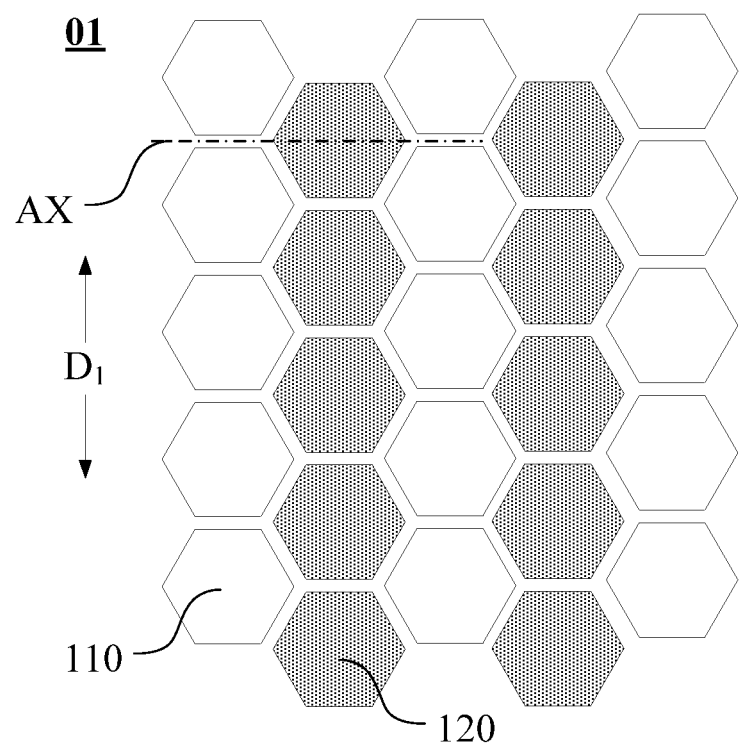
FIG. 8(a) shows another further arrangement manner of capacitive electrodes and radio-frequency receiving electrodes in a fingerprint identification module according to an embodiment of the present disclosure.

As shown in FIG. 8(a), the capacitive electrodes 110 and the radio-frequency receiving electrodes 120 have the regular hexagon shape. The capacitive electrodes 110 and the radio-frequency receiving electrodes 120 are respectively arranged into columns in the column direction, and the columns of capacitive electrodes 110 and the columns of radio-frequency receiving electrodes 120 are alternately arranged. In any one column of capacitive electrodes 110 and one adjacent column of radio-frequency receiving electrodes 120, any one of the capacitive electrodes 110 and the radio-frequency receiving electrodes 120 is offset from two adjacent other ones of the capacitive electrodes 110 and the radio-frequency receiving electrodes 120. In other words, in any one column of capacitive electrodes 110 and one adjacent column of radio-frequency receiving electrodes 120, a symmetrical axis AX of the regular hexagon of any one of the capacitive electrodes 110 and the radio-frequency receiving electrodes 120 in a direction perpendicular to the column direction is positioned between two regular hexagons of two adjacent other ones of the capacitive electrodes 110 and the radio-frequency receiving electrodes 120. For example, as shown in FIG. 8(a), a symmetrical axis AX of the regular hexagon of a radio-frequency receiving electrode 120 is positioned between two regular hexagons of two adjacent capacitive electrodes 110.

Figure 8B:
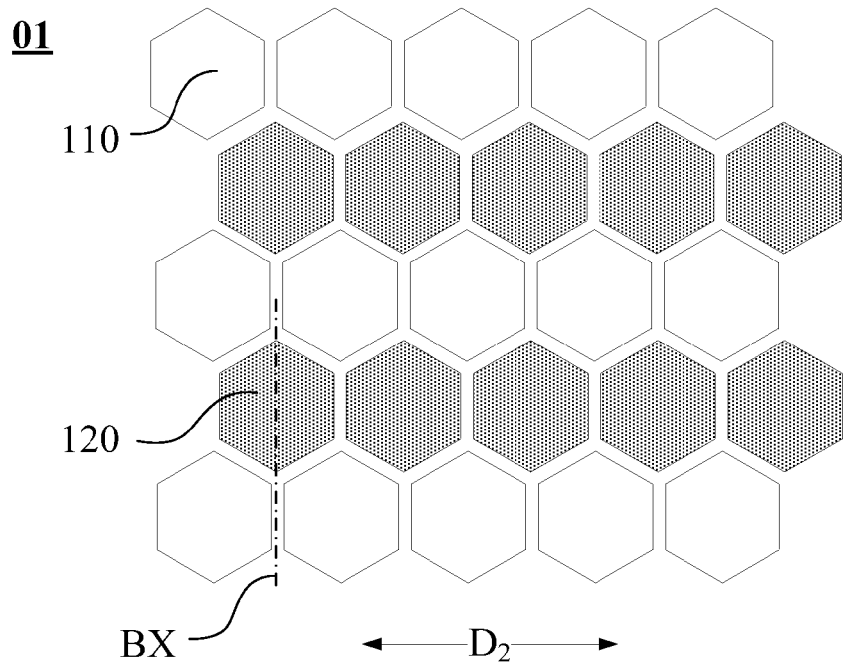
FIG. 8(b) shows still another further arrangement manner of capacitive electrodes and radio-frequency receiving electrodes in a fingerprint identification module according to an embodiment of the present disclosure.

Similarly, as shown in FIG. 8(b), the capacitive electrodes 110 and the radio-frequency receiving electrodes 120 have the regular hexagon shape. The capacitive electrodes 110 and the radio-frequency receiving electrodes 120 are respectively arranged into rows in the row direction, and the rows of capacitive electrodes 110 and the rows of radio-frequency receiving electrodes 120 are alternately arranged. In any one row of capacitive electrodes 110 and one adjacent row of radio-frequency receiving electrodes 120, any one of the capacitive electrodes 110 and the radio-frequency receiving electrodes 120 is offset from two adjacent other ones of the capacitive electrodes 110 and the radio-frequency receiving electrodes 120. In other words, in any one row of capacitive electrodes 110 and one adjacent row of radio-frequency receiving electrodes 120, a symmetrical axis BX of the regular hexagon of any one of the capacitive electrodes 110 and the radio-frequency receiving electrodes 120 in a direction perpendicular to the row direction is positioned between two regular hexagons of two adjacent other ones of the capacitive electrodes 110 and the radio-frequency receiving electrodes 120. For example, as shown in FIG. 8(b), a symmetrical axis BX of the regular hexagon of a radio-frequency receiving electrode 120 is positioned between two regular hexagons of two adjacent capacitive electrodes 110.

In the above embodiments, the capacitive electrodes 110 and the radio-frequency receiving electrodes 120 may have circle, oval or regular hexagon shapes, and the capacitive electrodes 110 and the radio-frequency receiving electrodes 120 are offset from each other in the row direction or in the column direction. Compared with the arrangements illustrated in FIGS. 6(a) to 6(c), the illustrated structures of the capacitive electrodes 110 and the radio-frequency receiving electrodes 120 may be more compact. As a result, a space utilization rate of the fingerprint identification module may be higher, more ridges and valleys of the fingerprint image may be identified and the identification accuracy may be increased.

Further, the controller 14 is configured to activate the radio-frequency sensor 12 to identify the fingerprint when the fingerprint information identified by the capacitive sensor 11 is not matched with the pre-stored fingerprint information of the finger 02 of the user. Such a step may be performed by a hardware having corresponding program instructions, for example. The program instructions may be stored in a computer readable storage medium. When the program instructions are performed, the transition control step is performed, so as to activate the radio-frequency sensor 12 to identify the fingerprint when the fingerprint information identified by the capacitive sensor 11 is not matched with the pre-stored fingerprint information of the finger 02 of the user. For example, the storage medium may include various medium which is capable of storing program codes, such as Read-Only Memory (ROM), Random Access Memory (RAM), disk, optical disk or the like.

Referring to FIG. 4 again, in the fingerprint identification module 01 according to the embodiment of the present disclosure, the capacitive identification mode by using the capacitive sensor 11 with a simple structure is firstly performed to identify the fingerprint information of the user directly. Also, the entire fingerprint image or local fingerprint image of the finger of the user is pre-stored in the fingerprint identification module 01. The fingerprint identified by the capacitive sensor 11 may be not consistent with the pre-stored fingerprint information of the finger 02 of the user. In one case, there may be pollutions such as oil, dust, water or the like on the finger 02 of the user to influence the identification result of the capacitive identification mode. In such a case, the controller 14 may activate the radio-frequency sensor 12 to identify the fingerprint of the finger 02 of the user, so as to increase the accuracy of fingerprint identification. In another case, the fingerprint of the user may not be pre-stored in the fingerprint identification module 01. In such a case, the controller 14 may also activate the radio-frequency sensor 12 to identify the fingerprint of the finger 02 of the user. If the fingerprint identified by the radio-frequency sensor 12 is not consistent with the pre-stored fingerprint information of the user, then it is proved that the fingerprint of the user is not pre-stored in the fingerprint identification module 01, so that a misjudgment on the fingerprint identification may be avoided.

Further, by means of the arrangements that the capacitive electrodes 110 and the radio-frequency receiving electrodes 120 are alternately arranged, it is not necessary to apply the radio-frequency identification mode onto the full screen, that is, it is not necessary to form all the electrodes from the radio-frequency receiving electrodes. As a result, a cost increase of the fingerprint identification module 01 is low, so as to facilitate integrating the fingerprint identification module 01 into the display device such as smart phone or the like.

Moreover, as shown in FIG. 9, the capacitive sensor 11 may also comprise a first image generator connected to the capacitive electrodes 110 and configured to generate a first local fingerprint image based on the induced capacitances.

Figure 9A:
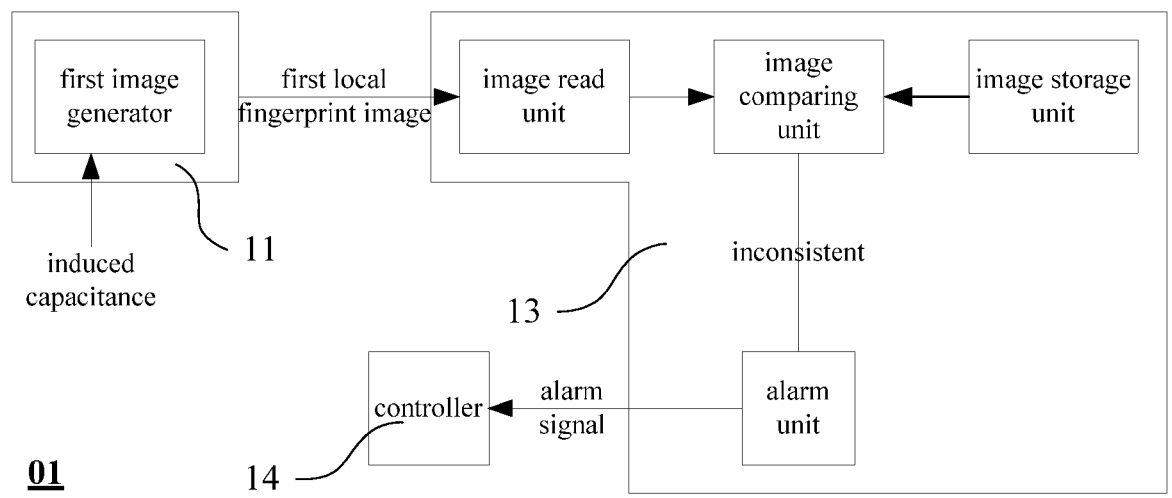
FIG. 9(a) is a structural schematic block view of a fingerprint identification module according to an embodiment of the present disclosure, in which a capacitive identification mode is shown.

Referring to FIG. 9(a), the fingerprint identification module 01 may also comprise an image processor 13. The image processor 13 may comprise: an image storage unit configured to store the fingerprint information of the user, the fingerprint information comprising the entire fingerprint image or local fingerprint image of the finger of the user; an image reading unit configured to read the first local fingerprint image; an image comparing unit configured to compare the read first local fingerprint image with the entire fingerprint image or local fingerprint image stored in the image storage unit; and an alarm unit configured to send an alarm signal to the controller 14 when the first local fingerprint image is not consistent with the entire fingerprint image or local fingerprint image stored in the image storage unit.

Figure 9B:
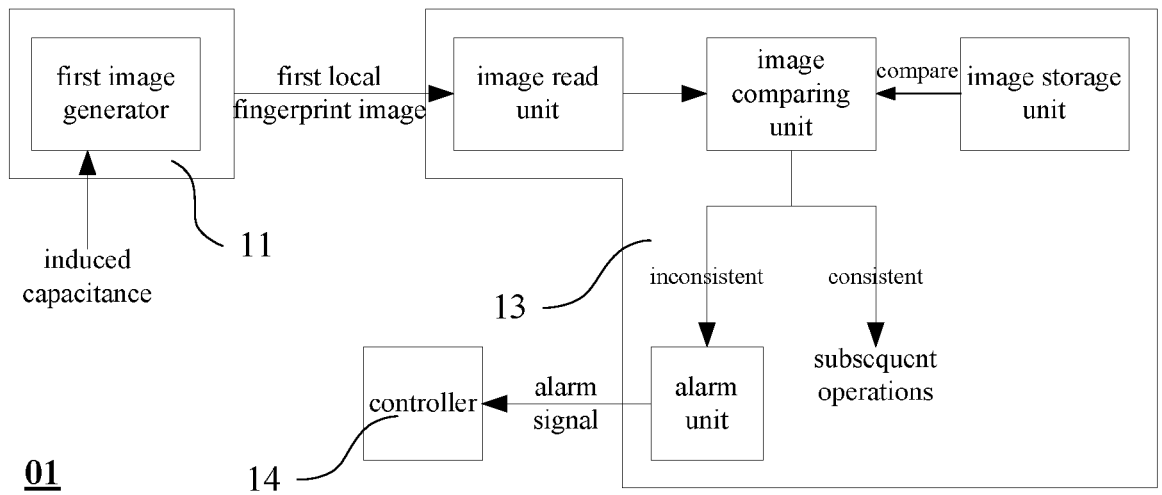
FIG. 9(b) is a functional schematic view corresponding to FIG. 9(a)

Referring to FIG. 9(b), a schematic view showing a functional relationship among the image processor 13, the capacitive sensor 11 and the controller 14 is shown, and it is not explained in detail here.

Figure 10:
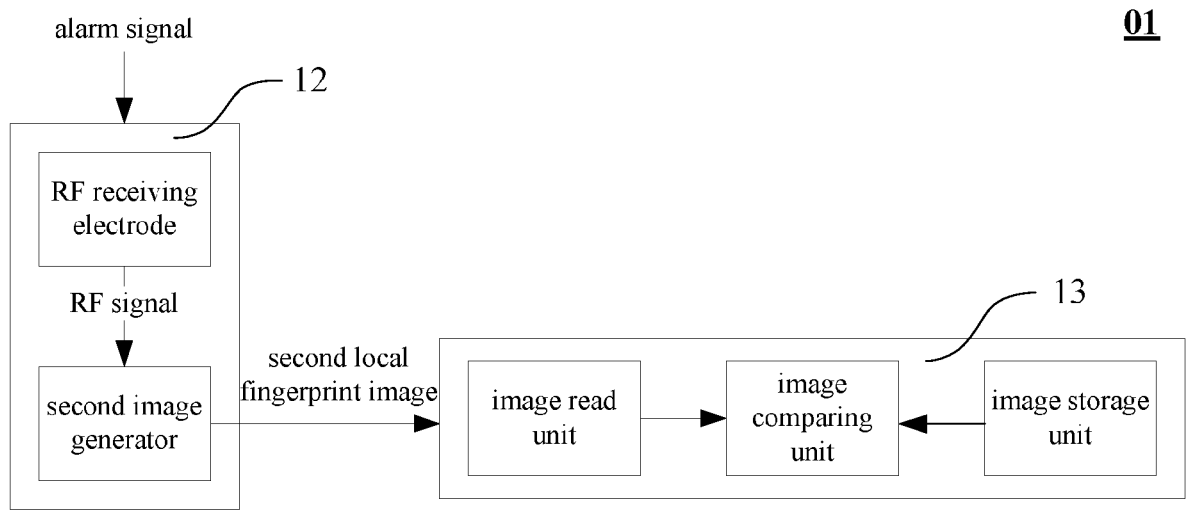
FIG. 10 is a structural schematic block view of a fingerprint identification module according to an embodiment of the present disclosure, in which a radio-frequency identification mode is shown.
Figure 11:
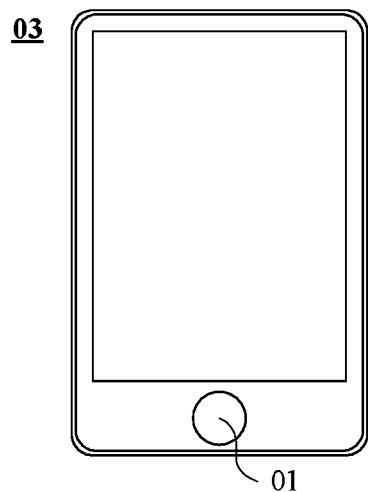
FIG. 11 is a schematic structural plan view of a display device according to an embodiment of the present disclosure.

Further, the controller 14 is configured to activate the radio-frequency sensor to identify the fingerprint of the user when the alarm signal is received. Referring to FIG. 5 again, the radio-frequency sensor 120 may comprise: a radio-frequency signal generator 121 configured to generate radio-frequency signals; and radio-frequency signal reference electrodes 122 which correspond to the radio-frequency receiving electrodes 120, respectively. The radio-frequency signal reference electrodes 122 are connected to the radio-frequency signal generator 121 for sending the radio-frequency signals to the finger 02 of the user. As shown in FIG. 10, the radio-frequency sensor 12 may also comprise a second image generator configured to generate a second local fingerprint image based on the above reflected signals.

Referring to FIG. 10, the image processor 13 may further be connected to the radio-frequency sensor 12. The image reading unit may further be configured to read the second local fingerprint image. The image comparing unit may further be configured to compare the read second local fingerprint image with the entire fingerprint image or local fingerprint image stored in the image storage unit.

Referring to FIG. 5 again, the radio-frequency signal reference electrodes 122 of the radio-frequency sensor 12 may have a structure of an integrated layer, and the capacitive electrodes 120 are positioned at a side of the radio-frequency signal reference electrodes 122 close to the finger of the user. In this way, the radio-frequency signal reference electrodes 122 may be simply manufactured, and may be more accurate when they are used as an exciting signal reference plane.

Further, referring to FIG. 5, the radio-frequency sensor 12 may further comprise a signal amplifier 123. The signal amplifier 123 is configured to amplify the reflected signals and then to send the amplified signals to the second image generator, so as to increase an accuracy for obtaining the reflected signals. As an example, the signal amplifier 123 may be an (ultra-high) impedance induction amplifier. The radio-frequency signal reference electrodes 122 may be provided with via-holes 124, through which the radio-frequency receiving electrodes 120 are connected with the signal amplifier 123.

Further, an embodiment of the present disclosure provides a fingerprint identification method. The method may comprise steps of:

S01. identifying a fingerprint of a user by means of a capacitive sensor; and

S02. activating a radio-frequency sensor to identify the fingerprint of the user when the fingerprint identified by the capacitive sensor is not consistent with fingerprint information of the user pre-stored in the fingerprint identification module.

Further, the step S01 may comprise steps of:

S11. detecting induced capacitances generated between capacitive electrodes of the capacitive sensor and the ridges and generated between the capacitive electrodes and the valleys; and S12. identifying the fingerprint based on the induced capacitances.

Further, the step S02 may comprise steps of:

S21. obtaining reflected signals by means of the radio-frequency receiving electrodes when the fingerprint identified by the capacitive sensor is not consistent with the fingerprint information of the user pre-stored in the fingerprint identification module, the reflected signals being signals which are reflected by a texture structure between an epidermal layer and a dermal layer of the finger when radio-frequency signals from the radio-frequency sensor contact the texture structure; and S22. identifying the fingerprint based on the reflected signals.

In the fingerprint identification module and the fingerprint identification method according to the embodiments of the present disclosure, the capacitive identification mode by using the capacitive sensor with a simple structure is firstly performed to identify the fingerprint information of the user directly. Also, the entire fingerprint image or local fingerprint image of the finger of the user is pre-stored in the fingerprint identification module. The fingerprint identified by the capacitive sensor may be not consistent with the pre-stored fingerprint information of the finger of the user. In one case, there may be pollutions such as oil, dust, water or the like on the finger of the user to influence the identification result of the capacitive identification mode. In such a case, the controller may activate the radio-frequency sensor to identify the fingerprint of the finger of the user, so as to increase the accuracy of fingerprint identification. In another case, the fingerprint of the user may not be pre-stored in the fingerprint identification module. In such a case, the controller may also activate the radio-frequency sensor to identify the fingerprint of the finger of the user. If the fingerprint identified by the radio-frequency sensor is not consistent with the pre-stored fingerprint information of the user, then it is proved that the fingerprint of the user is not pre-stored in the fingerprint identification module, so that a misjudgment on the fingerprint identification may be avoided.

Further, by means of the arrangements that the capacitive electrodes and the radio-frequency receiving electrodes are alternately arranged, it is not necessary to apply the radio-frequency identification mode onto the full screen. As a result, a cost increase of the fingerprint identification module is low, so as to facilitate integrating the fingerprint identification module into the display device such as smart phone or the like.

Moreover, an embodiment of the present disclosure provides a display device 02 comprising the above fingerprint identification module 01.

The display device may be any product or component having display function, such as liquid crystal panel, liquid crystal display, liquid crystal television, organic electroluminescent display panel, organic electroluminescent display, organic electroluminescent television or e-paper, digital frame, cellphone, tablet computer and the like.

If the display device is a smartphone or a tablet computer, the accuracy of fingerprint identification for the user may be further increased, thereby avoiding a step of inputting a password additionally due to fingerprint identification failure.

It should be noted that all the accompanying drawings are only brief schematic views of the fingerprint identification module 01. In the drawings, only the structures associated with the inventive concept of the present disclosure are clearly illustrated, and other structures which are not associated with the inventive concept are partially illustrated or even not illustrated.

The foregoing descriptions are merely specific embodiments of the present invention, but the scope of the present invention is not limited thereto. Any changes or substitutes which may be readily envisaged by those skilled in the art within the technical scope of the present disclosure shall fall into the scope of the present invention. Accordingly, the scope of the present invention shall be defined by the appended claims.

What is claimed is:

1. A fingerprint identification module, comprising:
    a capacitive sensor comprising a plurality of capacitive electrodes which do not contact with each other, the capacitive sensor being configured to identify a fingerprint of a finger of a user based on induced capacitances generated between the capacitive electrodes and ridges in an epidermal layer of the finger and generated between the capacitive electrodes and valleys in the epidermal layer;
    a radio-frequency sensor comprising a plurality of radio-frequency receiving electrodes which do not contact with each other, the radio-frequency sensor being configured to identify the fingerprint based on reflected signals received by the radio-frequency receiving electrodes, the reflected signals being signals which are reflected by a texture structure between the epidermal layer and a dermal layer of the finger when radio-frequency signals from the radio-frequency sensor contact the texture structure; and
    a controller communicated with both the capacitive sensor and the radio-frequency sensor, the controller being configured to activate the radio-frequency sensor to identify the fingerprint of the user when fingerprint information identified by the capacitive sensor is not consistent with fingerprint information of the user pre-stored in the fingerprint identification module,
    wherein the capacitive electrodes and the radio-frequency receiving electrodes are alternately arranged.

2. The fingerprint identification module according to claim 1, wherein,
    the capacitive sensor further comprises a first image generator connected to the capacitive electrodes and configured to generate a first local fingerprint image based on the induced capacitances; and
    the fingerprint identification module further comprises an image processor connected to the capacitive sensor, the image processor being-configured to:
        store the fingerprint information of the user, the fingerprint information comprising an entire fingerprint image or a local fingerprint image of the finger of the user;
        read the first local fingerprint image;
        compare the read first local fingerprint image with the entire fingerprint image or local fingerprint image stored in an image storage unit; and
        send an alarm signal to the controller when the first local fingerprint image is not consistent with the entire fingerprint image or local fingerprint image stored in the image storage unit.

3. The fingerprint identification module according to claim 2, wherein,
    the controller is configured to activate the radio-frequency sensor to identify the fingerprint of the user when receiving the alarm signal.

4. The fingerprint identification module according to claim 3, wherein, the radio-frequency sensor further comprises:
    a radio-frequency signal generator configured to generate radio-frequency signals;
    radio-frequency signal reference electrodes which correspond to the radio-frequency receiving electrodes, respectively and are connected to the radio-frequency signal generator for sending the radio-frequency signals to the finger of the user; and a second image generator configured to generate a second local fingerprint image based on the reflected signals, wherein the image processor is further connected to the radio-frequency sensor, and the image processor is further configured to read the second local fingerprint image, and to compare the read second local fingerprint image with the entire fingerprint image or local fingerprint image stored in the image storage unit.

5. The fingerprint identification module according to claim 4, wherein, the radio-frequency signal reference electrodes have a structure of an integrated layer, and the capacitive electrodes are positioned at a side of the radio-frequency signal reference electrodes close to the finger of the user.

6. The fingerprint identification module according to claim 4, wherein, the radio-frequency sensor further comprises a signal amplifier configured to amplify the reflected signals and then to send the amplified signals to the second image generator, and wherein the radio-frequency signal reference electrodes are provided with via-holes, through which the radio-frequency receiving electrodes are connected with the signal amplifier.

7. The fingerprint identification module according to claim 1, wherein, both the capacitive electrodes and the radio-frequency receiving electrodes are respectively arranged into rows in a first direction, and the rows of capacitive electrodes and the rows of radio-frequency receiving electrodes are alternately arranged; or both the capacitive electrodes and the radio-frequency receiving electrodes are respectively arranged into rows in a second direction, and the rows of capacitive electrodes and the rows of radio-frequency receiving electrodes are alternately arranged; or both the capacitive electrodes and the radio-frequency receiving electrodes are alternately arranged both in the first direction and in the second direction, wherein the first direction and the second direction intersect with each other.

8. The fingerprint identification module according to claim 7, wherein, the capacitive electrodes and the radio-frequency receiving electrodes have the same shape which is a rhombus shape, both the capacitive electrodes and the radio-frequency receiving electrodes are alternately arranged both in the first direction and in the second direction, and the first direction and the second direction are parallel to two adjacent sides of the rhombus, respectively.

9. The fingerprint identification module according to claim 7, wherein, the capacitive electrodes and the radio-frequency receiving electrodes have the same shape which is selected from circle, oval and regular hexagon shapes, the first direction and the second direction are a column direction and a row direction, respectively, and wherein both the capacitive electrodes and the radio-frequency receiving electrodes are respectively arranged into columns in the column direction, and the columns of capacitive electrodes and the columns of radio-frequency receiving electrodes are alternately arranged, wherein, in any one column of capacitive electrodes and one adjacent column of radio-frequency receiving electrodes, any one of the capacitive electrodes and the radio-frequency receiving electrodes is offset from two adjacent other ones of the capacitive electrodes and the radio-frequency receiving electrodes; or both the capacitive electrodes and the radio-frequency receiving electrodes are respectively arranged into rows in the row direction, and the rows of capacitive electrodes and the rows of radio-frequency receiving electrodes are alternately arranged, wherein, in any one row of capacitive electrodes and one adjacent row of radio-frequency receiving electrodes, any one of the capacitive electrodes and the radio-frequency receiving electrodes is offset from two adjacent other ones of the capacitive electrodes and the radio-frequency receiving electrodes.

10. The fingerprint identification module according to claim 7, wherein, the capacitive electrodes and the radio-frequency receiving electrodes have the same shape which is a rectangular shape, the first direction is one of a row direction and a column direction, and the second direction is another one of the row direction and the column direction.

11. The fingerprint identification module according to claim 1, wherein, the capacitive electrodes and the radio-frequency receiving electrodes are distributed in such a way that there are 400-600 electrodes per square inch.

12. A display device comprising a fingerprint identification module according to claim 1.

13. A display device comprising the fingerprint identification module according to claim 2.

14. A display device comprising the fingerprint identification module according to claim 4.

* * * * *